(12) United States Patent
Winter

(10) Patent No.: US 8,113,361 B2
(45) Date of Patent: *Feb. 14, 2012

(54) SHELVING UNIT

(75) Inventor: Paul Henry Winter, Newark, DE (US)

(73) Assignee: Zenith Products Corp., New Castle, DE (US)

( * ) Notice: Subject to any disclaimer, the term of this patent is extended or adjusted under 35 U.S.C. 154(b) by 375 days.

This patent is subject to a terminal disclaimer.

(21) Appl. No.: 12/425,472

(22) Filed: Apr. 17, 2009

(65) Prior Publication Data

US 2010/0264104 A1     Oct. 21, 2010

(51) Int. Cl.
   *A47B 57/00*     (2006.01)
(52) U.S. Cl. ..................................................... 211/186
(58) Field of Classification Search ............. 211/186, 211/149, 150; D6/479, 465, 474, 437
   See application file for complete search history.

(56) References Cited

U.S. PATENT DOCUMENTS

| | | | | |
|---|---|---|---|---|
| 4,754,504 | A | * | 7/1988 | Cellini ............................. 4/610 |
| D318,388 | S | * | 7/1991 | Kee ................................ D6/465 |
| D320,900 | S | * | 10/1991 | Yau Kee ........................ D6/465 |
| D331,846 | S | * | 12/1992 | Yau Kee ........................ D6/465 |
| 5,505,318 | A | * | 4/1996 | Goff .......................... 211/90.03 |
| 5,662,297 | A | * | 9/1997 | Christensen et al. ....... 211/105.1 |
| D388,267 | S | * | 12/1997 | Newkirk et al. ............... D6/474 |
| D392,121 | S | * | 3/1998 | Newkirk et al. ............... D6/437 |
| 5,899,346 | A | * | 5/1999 | Newkirk ........................ 211/149 |
| D418,341 | S | * | 1/2000 | Carville et al. ................ D6/509 |
| D432,820 | S | * | 10/2000 | Walters-Dowding et al. . D6/465 |
| 6,152,314 | A | * | 11/2000 | Besanko et al. ............... 211/134 |
| D454,730 | S | * | 3/2002 | Harwanko ...................... D6/479 |
| D456,638 | S | * | 5/2002 | Walker ........................... D6/465 |
| D458,791 | S | * | 6/2002 | Harwanko ...................... D6/570 |
| D471,031 | S | * | 3/2003 | Harwanko ...................... D6/465 |
| D471,032 | S | * | 3/2003 | Clucas ........................... D6/465 |
| D487,653 | S | * | 3/2004 | Harwanko ...................... D6/479 |
| D497,273 | S | * | 10/2004 | Harwanko ...................... D6/479 |
| D497,497 | S | * | 10/2004 | Harwanko ...................... D6/479 |
| D501,738 | S | * | 2/2005 | Clucas ........................... D6/465 |
| D507,129 | S | * | 7/2005 | Harwanko ...................... D6/479 |
| D572,502 | S |  | 7/2008 | Yang et al. |
| 7,401,754 | B2 |  | 7/2008 | Welch et al. |
| 7,404,609 | B2 |  | 7/2008 | Nielsen |
| 7,407,060 | B2 |  | 8/2008 | Swartz et al. |
| D577,224 | S |  | 9/2008 | Karsson |
| 7,419,062 | B2 |  | 9/2008 | Mason |
| D588,379 | S | * | 3/2009 | Chung ........................... D6/479 |
| D589,281 | S | * | 3/2009 | Chung ........................... D6/479 |
| 7,512,997 | B2 | * | 4/2009 | Dewees ............................. 4/610 |
| D591,533 | S | * | 5/2009 | Karsson ......................... D6/474 |
| D599,140 | S | * | 9/2009 | Winter ........................... D6/479 |
| 2010/0264104 | A1 | * | 10/2010 | Winter ........................... 211/186 |

\* cited by examiner

*Primary Examiner* — Sarah Purol

(74) *Attorney, Agent, or Firm* — Potter Anderson Corroon LLP

(57) ABSTRACT

A space saving having at least three shelves where objects can be stored that is capable of being positioned over an object or addition items can be stored in an open space under shelves of the unit.

6 Claims, 4 Drawing Sheets

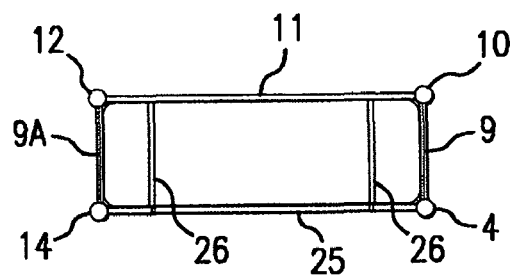
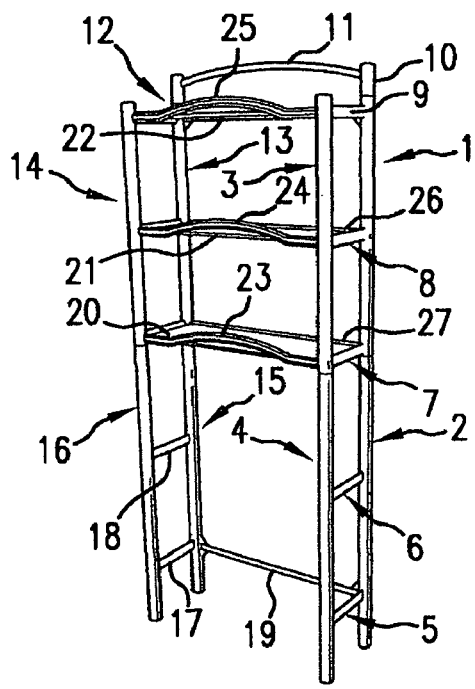
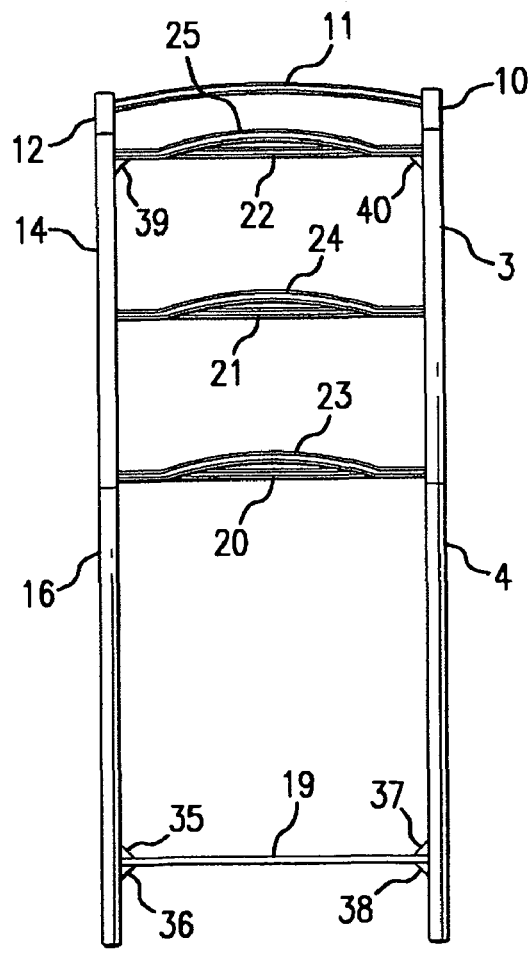
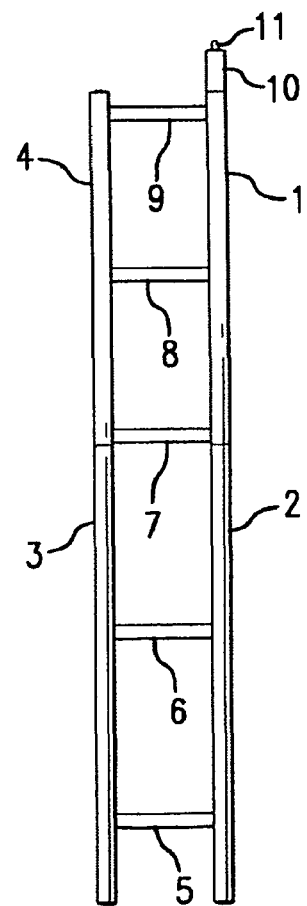

SHELVING UNIT

FIELD OF THE INVENTION

The present disclosure relates to a shelving unit and particularly to a shelving unit that is a space-saving unit where objects can be stored and that is capable of being positioned over an object or addition items can be stored in an open space under the shelves of the unit.

BACKGROUND OF THE INVENTION

There are a variety of shelving units available for storing goods, such as, a conventional book case to a shelving unit for displaying goods as shown in Mason U.S. Pat. No. 7,419,062 or wall mounted shelving systems as shown in Swartz et al. U.S. Pat. No. 7,407,060. Typically, such shelving units extend from the floor to a typical height to which a person can reach or higher. Often, it would be desirable to have a unit which could be designed to fit over an object such as a vanity, toilet, night stand and the like and have shelving above the object over which it has been placed. Also, it may be desirable to store items below the unit and have shelves easily reached at a higher level. The novel shelving unit of this invention provides such a unit that can be used in a variety of situations, e.g., by being able to place the unit over an existing furniture or fixture or simply store items under the unit.

SUMMARY OF THE INVENTION

A rectangular shaped space-saving shelving unit for holding a plurality of objects having two sides, a back, a front and a top, the unit comprising:
  (a) two side members each comprising two hollow tubular rods and connecting the two tubular rods together are at least three rectangular shaped side cross members each firmly attached to the two hollow tubular rods;
  (b) a top section which comprises two cap hollow tubular rods, wherein each cap tubular rod is positioned over each of the a hollow tubular rods of the side members and a rod connecting the two cap tubular rods thereby forming the back of the unit;
  (c) at least three horizontal shelves each being attached to a side cross member of the side member and in parallel relationship to the each of the other shelves and the top section; wherein each shelf comprises a front, back and two side sections and wherein each side section being U shaped and capable of fitting over a rectangular side cross members firmly engaged with the side member; and
  (d) a lower reinforcing member engaged with each of the side members thereby fastening the two side members together and forming a back of the unit leaving the front portion of the unit open to allow the unit to fit over an object or allow for storage there-under.

Other objects and advantages will become apparent to those skilled in the art upon reference to the detailed description that hereinafter follows.

BRIEF DESCRIPTION OF THE FIGURES

FIG. 1 is a perspective view of the space saving shelving unit.
FIG. 2 is a front elevation view of the space saving shelving unit.
FIG. 3 is a right side view of the space saving shelving unit.
FIG. 4 is a top view of the space saving shelving unit.

DETAILED DESCRIPTION OF THE INVENTION

Figure 6:
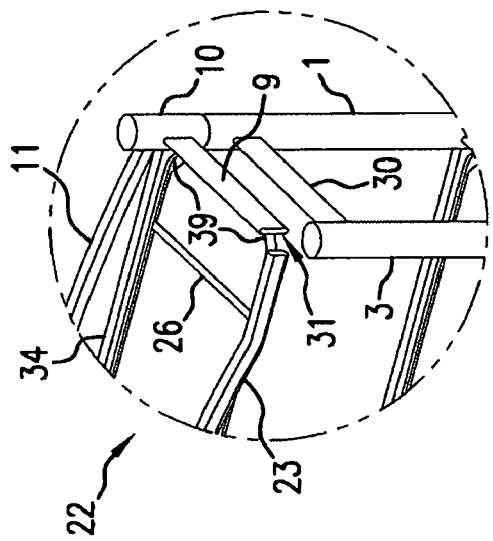
FIG. 6 is the detail A shown in FIG. 5.

The invention is directed to a space saving shelving unit that provides for storage or display of items on the top section of the unit and allows for storage under the lower section of the unit or allows placement of the unit over existing items of furniture or over a fixture. The following figures describe preferred embodiments of the invention but are not intended to limit the scope of the invention.

The term "shelving unit" as used herein has a broad meaning and includes items, such as, a book case, a display case for showing items, general storage unit for a variety of items or a decorative unit.

The term "comprising" is intended to include embodiments encompassed by the terms "consisting essentially of" and "consisting of". Similarly, the term "consisting essentially of" is intended to include embodiments encompassed by the term "consisting of".

FIG. 1 shows a perspective view of the space saving shelving unit. Hollow tubular rod 1 forms the upper right back corner of the unit. Hollow tubular rod 2 forms the lower back corner of the unit and the end of rod 2 is inserted into the bottom of rod 1. Hollow tubular rod 3 forms the upper right front corner of the unit and hollow tubular rod 4 forms the lower right front corner of the unit. The end of rod 4 is inserted into rod 3. Lower rectangular shaped cross members 5 and 6 are each firmly attach at their ends to rods 2 and 4 and similarly rectangular shaped cross members (not shown in FIG. 1) hold shelves 20, 21 and 22 and are firmly attached to rods 1 and 2. The result being the right side of the unit as is shown in FIG. 3. The sides of each of the shelves 20, 21, and 22 are shown as 7, 8 and 9 and are U shaped and fit over the rectangular cross members that are not shown. Forming the top back of the unit are caps 10 and 12 each are hollow tubular caps closed on the top and each positioned over the top ends of hollow tubular rods 1 and 12 and the caps 10 and 12 are connected together with a rod 11 thereby forming the top back of the unit. The left side of the unit is similar wherein hollow tubular rod 13 forms the upper left back corner of the unit. Hollow tubular rod 15 forms the lower left back corner of the unit, the end of which is inserted into hollow tubular rod 13. Hollow tubular rod 14 forms the upper left front corner of the unit and hollow tubular rod 16 forms the lower left front corner of the unit and the end of rod 16 is inserted into rod 14. Lower rectangular shaped cross members 17 and 18 are each firmly attach at their ends to rods 15 and 16 and similarly, rectangular shaped cross members (not shown in FIG. 1) hold shelves 20, 21 and 22 and are firmly attached to rods 13 and 14. 27 and 26 show the back of shelves 20 and 21, respectively. Curved rods 23, 24 and 25 form the front of shelves 20, 21 and 22 respectively. The bottom of the unit has a rectangular rod 19 that is firmly connected to rods 2 and 15 and forms a lower back support for the unit. A storage area or an area which can accommodate a fixture, for example of a small dresser or night stand or a toilet is defined by the shelf 20 and the right and left sides defined by rods 2 and 4 and 15 and 16 and the back support rod 19.

FIG. 2 is the front elevation view of the space saving shelving unit. Hollow tubular rods 3 and 4 and 14 and 16 show the right and left front corners of the unit, respectively. Shelves 20, 21 and 22 along with the curved rods 23, 24 and 25 that form the front of each of the shelves are shown. Caps 10 and 12 connected with rod 11 form the top of the unit. Back support rod 19 connected to hollow rods 2 and 15 (not shown in FIG. 2 but shown in FIG. 1) has diagonal supports 35 and 36 firmly attached to hollow rod 15 and diagonal supports 37 and 38 firmly attached to hollow rod 2.

FIG. 3 is the right side view of the space saving shelving unit. The left side view of the unit is not shown but is the mirror image of the right side view. Hollow tubular rods 3 and 4 form the right front corner of the unit while hollow tubular rods 1 and 2 form the back corner of the unit. Lower rectangular rods 5 and 6 are firmly attached to hollow tubular rods 2 and 3. 7, 8 and 9 show the sides of shelves 20, 21 and 22 respectively. The cap 10 fits over the hollow tubular rod 1 and 11 is the rod connected to the cap 10.

FIG. 4 is the top view of the space saving shelving unit. Hollow tubular rod caps 10 and 12 connected with rod 11 form the back of the unit. 9 and 9A are the right and left sides of the shelf 22, respectively. Cross braces 26 each provide support to the shelf 22. Each of the shelves have similar cross braces thereby allowing a sheet of glass or plastic to be positioned thereon to form a bottom for the shelf to allow for storage or display of small articles. Curved rod 25 forms the front of shelf 22.

Figure 5:
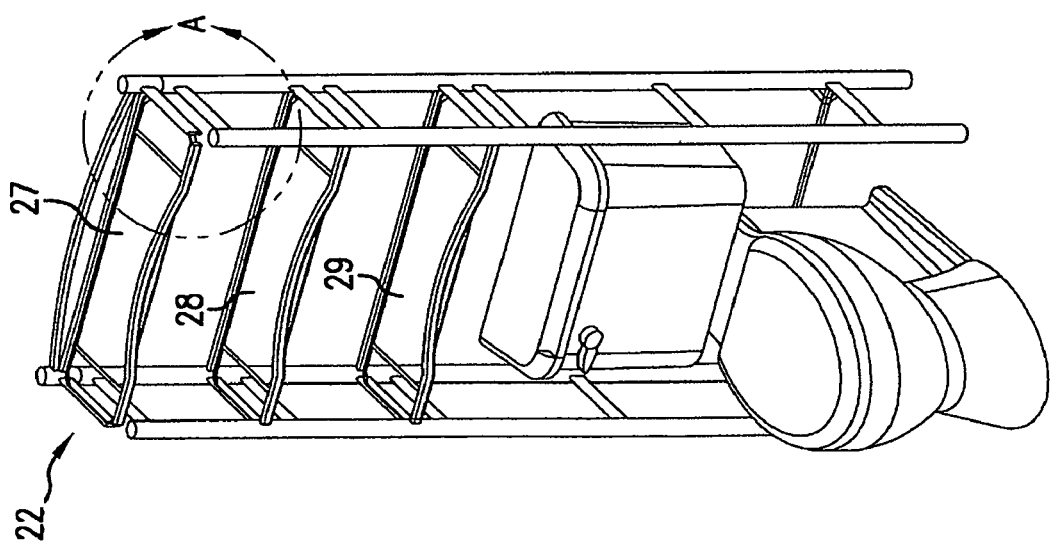
FIG. 5 is an exploded perspective view of the space saving shelving unit.

FIG. 5 is an exploded perspective view of the space saving shelving unit. Shelf tops 27, 28 and 29 are shown as glass or clear plastic but as pointed out above other materials can be used. Shelf 22 is shown in a pre-assembled position and circular detail A illustrated in FIG. 6.

FIG. 6 shows the detail A of FIG. 5. The corners of each of the shelves 20, 21 and 22 have the same configuration as shown in detail A in order for all the shelves to fit into the unit. Shelf 22 has the curved rod 23 that forms the front of the shelf and has a cross brace 26 that is firmly attached to curved rod 23 and the back rectangular rod 34 and has side 9 which is U shaped and fits over cross member 30 firmly attached to hollow tubular rods 1 and 3. The configuration of each of the corners 31 of the shelves 20, 21 and 22 have a side (side 9 as shown in FIG. 6) firmly attached by brace 39 to the curved rod 23 (front) of the shelf thereby forming a recessed opening which allows positioning of the shelf in relation to the hollow tubular rod 3 that forms the side of the unit as shown in FIG. 3. Each of the other corners of the shelves have the same configuration.

Figure 7:
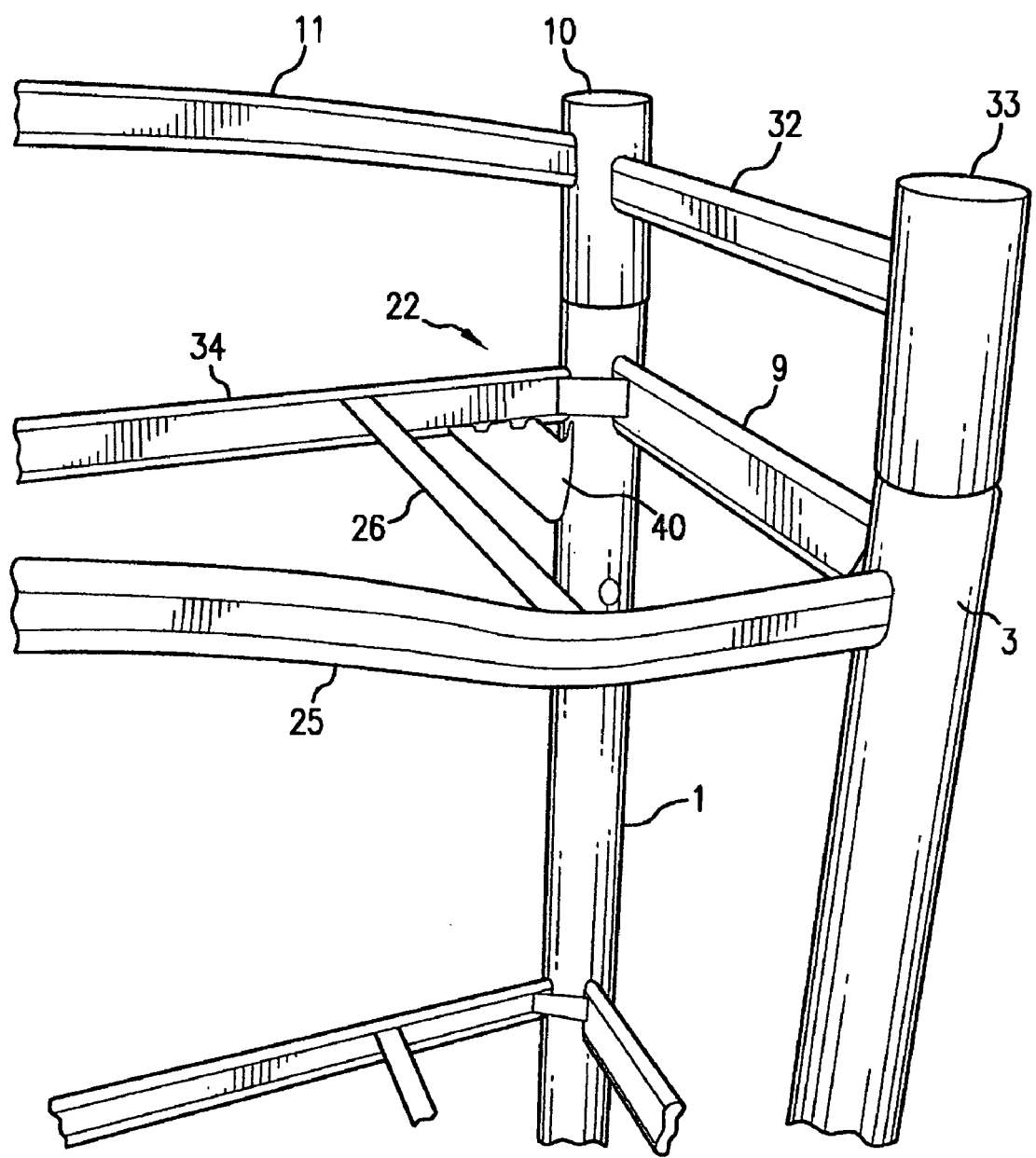
FIG. 7 is a partial perspective of an alternate top for the space saving shelving unit.

FIG. 7 shows a partial perspective of an alternate top for the space saving shelving unit. A side section comprising a cap 33 of a hollow tubular rod that is positioned over hollow tubular rod 3 which forms the right front corner of the unit. Firmly attached to the cap 33 is a rectangular shaped cross member 32 that is attached at the opposite end to the cap 10 of a hollow tubular rod that is positioned over hollow tubular rod 1. Rod 11 is firmly connected to cap 10 and forms the back of the unit. Shelf 22 is shown with side 9, cross brace 26 firmly attached to curved rod 25 that forms the front of the shelf and firmly attached to rectangular straight rod 34 that forms the back of the shelf. A brace 40 firmly attached to hollow tubular rod 1 supports shelf 22.

Figure 8:
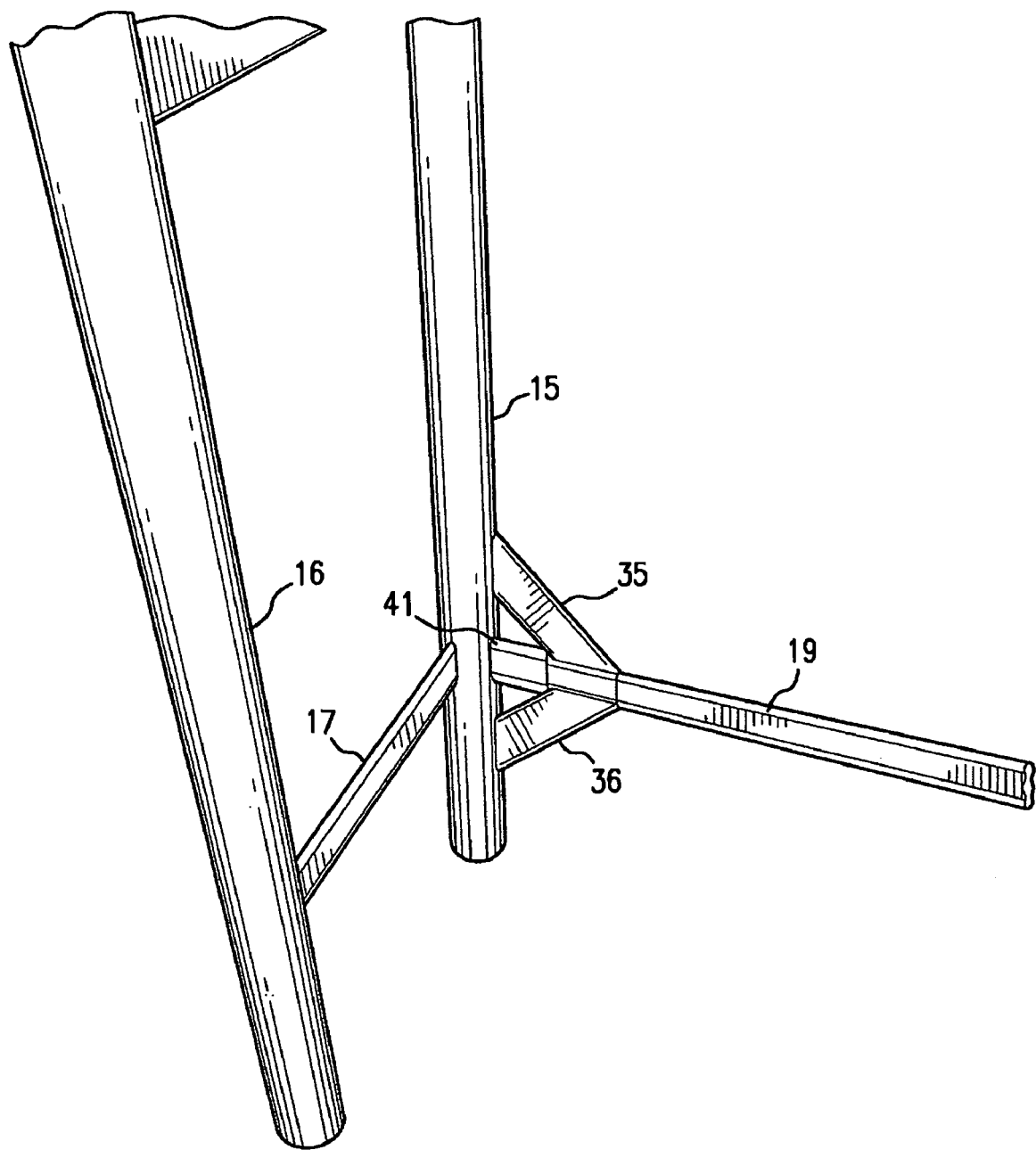
FIG. 8 is a partial perspective view of the bottom back support of the space saving shelving unit.

FIG. 8 shows a partial perspective view of the bottom back support of the space saving shelving unit. Slot 41 is firmly attached to hollow tubular rod 15 and the end rectangular rod 19 that is the lower back support for the unit slides into slot 41. Braces 35 and 36 firmly attached to the hollow tubular rod 15 serve to support the rectangular rod 19. Lower rectangular shaped cross member 17 is firmly attached to hollow tubular rods 15 and 16.

The invention as fully described above may embody other specific forms or variations without departing from its spirit or essential characteristics. In that regard, the embodiments described above are to be considered in all respects as illustrative and not restrictive, the scope of the invention being indicated by the claims rather than by the foregoing description and any and all changes which come within the meaning and range of equivalency of the claims are intended to be embraced therein.

What is claimed is:

1. A rectangular shaped space-saving shelving unit for holding a plurality of objects having two sides, a back, a front and a top, the unit comprising:
    (a) two side members each comprising two hollow tubular rods and connecting the two tubular rods together are at least three rectangular shaped side cross members each firmly attached to the two hollow tubular rods and wherein the two side members each comprise a first and second tubular rod section wherein the tubular rod of the first section fits into the tubular rod of the second section;
    (b) a top section which comprises two cap hollow tubular rods, wherein each cap tubular rod is positioned over each of the hollow tubular rods of the side members and a rod connecting the two cap tubular rods thereby forming the back of the unit and wherein the rod of the back of the top section is curved;
    (c) at least three horizontal shelves each being attached to a side cross member of the side member and in parallel relationship to the each of the other shelves and the top section; wherein each shelf comprises a front, back and two side sections and wherein each side section being U shaped and capable of fitting over a rectangular side cross members firmly engaged with the side member and wherein each of the shelves have an upwardly curved front side capable of keeping an object stored on the shelf from sliding off of the shelf; and
    (d) a lower reinforcing member engaged with each of the side members thereby fastening the two side members together and forming a back of the unit leaving the front portion of the unit open to allow the unit to fit over an object or allow for storage there-under.

2. The shelving unit of claim 1, wherein a the top section is a three sided section having two sides and a back and an open front where the top section comprises four capped hollow tubular rods wherein each tubular rod is positioned over the a hollow tubular rod of the side members and wherein the capped hollow tubular rods are firmly attach to each other by rods thereby forming the two sides of the top section and a back of the top section leaving an open front of the top section.

3. The shelving unit of claim 1, wherein each of the side members have 5 cross members.

4. The shelving unit of claim 3, wherein the lower reinforcing member is in alignment with each of the cross members of the side member.

5. The shelving unit of claim 1, wherein each of the tubular members and rods comprise aluminum.

6. The shelving unit of claim 1 whereby each of the members forming the unit can be assembled without the use of tools.

* * * * *